June 2, 1970

R. V. POLE 3,516,013

SCANNING LASER HAVING A CONJUGATE CONCENTRIC
CAVITY SO THAT THE DIRECTION IN WHICH LIGHT
IS EMITTED CAN BE CONTROLLED

Original Filed Dec. 23, 1963

INVENTOR
ROBERT V. POLE

BY George Baron

ATTORNEY

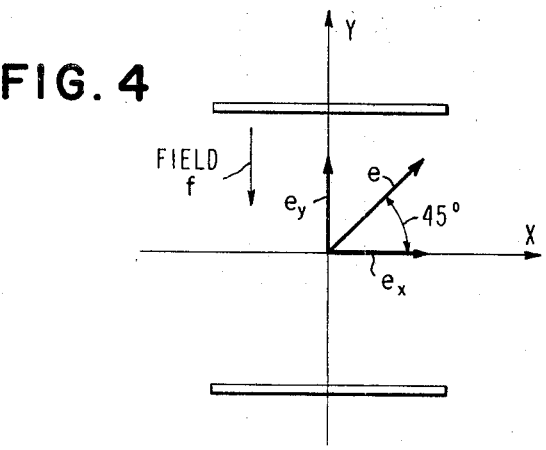
FIG. 4
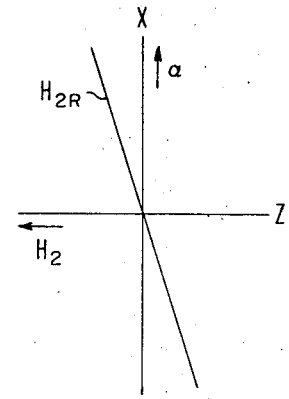
FIG. 6
FIG. 5
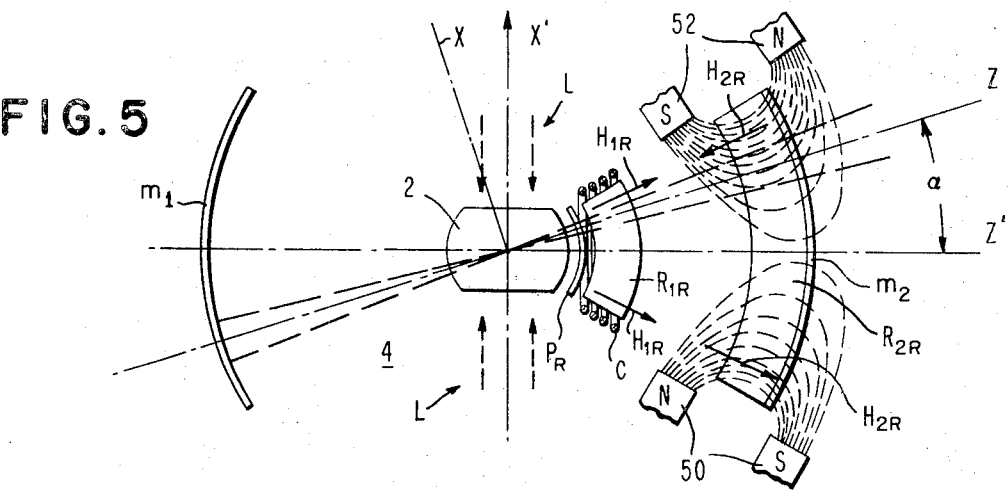
FIG. 7
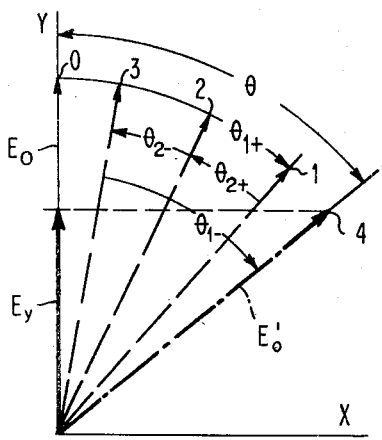
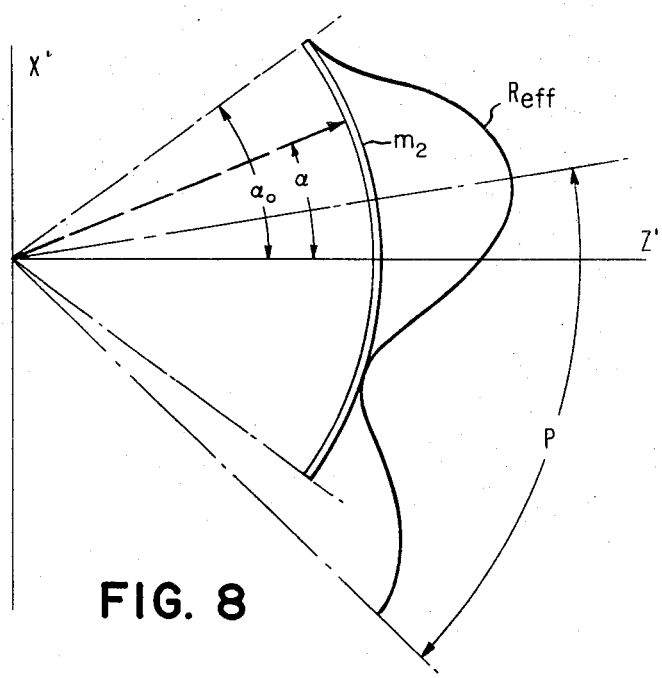
FIG. 8

3,516,013
SCANNING LASER HAVING A CONJUGATE CONCENTRIC CAVITY SO THAT THE DIRECTION IN WHICH LIGHT IS EMITTED CAN BE CONTROLLED
Robert V. Pole, Yorktown Heights, N.Y., assignor to International Business Machines Corporation, New York, N.Y., a corporation of New York
Continuation of application Ser. No. 332,617, Dec. 23, 1963. This application June 10, 1968, Ser. No. 742,949
Int. Cl. H01s 3/06, 3/08
U.S. Cl. 331—94.5                    6 Claims

ABSTRACT OF THE DISCLOSURE

A system for scanning a laser beam is provided wherein high scanning speed, high resolution and high angular swing are obtainable. An active medium is placed in a conjugate concentric cavity, such medium being spherical or cylindrical and serving as a lens. The radius $r$ of the spherical active medium and the radius R of the two mirrors of the cavity are related by the expression $$R = \frac{nr}{n - n_0}$$

where $n$ is the index of refraction of the active medium and $n_0$ is the index of refraction of the material surrounding the active medium and lying between the mirrors of the conjugate concentric cavity. The use of two mirror surfaces that are optically conjugate and a lasing material that is lenticular in construction permits the lasing cavity to support all modes equally well. Thus, one maximum point of energy of the laser beam serves as an object point and another maximum point of energy is the image point of the lasing beam. The ability to obtain such imaging of a point through the lenticular operation of the active medium enhances the scanning process.

---

This application is a continuation of application Ser. No. 332,617, filed Dec. 23, 1963 and now abandoned.

This invention relates to lasers, and more particularly to laser systems capable of generating a scanning light beam.

Light amplifications by stimulated emission has become increasingly important as a tool for use in communications, optics, computers, etc. because one is now able to obtain a very high energy beam of light that is coherent. The use of such a high energy beam of light would be particularly important where visual displays are employed or where it is desired to rapidly scan a volume of space. This can be, to an extent, accomplished by known methods as, for example, by the mechanical motion of mirrors or prisms or by the use of electrically controlled birefringence in some crystals. However, all these known methods are, firstly, external to the laser and are thus independent of the type of source of light. Secondly, they all fall short of some or all of the following three essential properties of a scanner: high scanning speed, high resolution and high angular swing. For instance, mechanical scanning is inherently slow. Methods employing electrically controlled birefringence are lacking both the resolution and the high angular swing.

The present invention embodies all of the above three properties and more as it will become evident hereinafter. It does this by making the scanning operation be an integral part of the lasing process in a novel type of resonant laser cavity. Thus there are two basic aspects to this invention. First is the novel type of the laser's resonant circuit or cavity which is tentatively termed "conjugated-concentric cavity" and which provides for high resolution and high angular swing of the scanning beam. The second aspect of the invention are two alternative methods of providing angular scanning which is electrically controlled and is capable of high scanning speeds.

The conjugated-concentric cavity (CCC) considered as the resonant circuit of the laser oscillator consists of a spherically shaped solid state active medium placed in the center of a pair of concentric, spherically shaped external mirrors. The distances between the active medium and the mirrors are so chosen that the two mirrors are mutually optically conjugated, i.e., they occupy respectively an object and an image surface with respect to the spherical active medium considered as a lens. In other words, the resonant cavity or the resonant circuit is formed not only by the external mirrors but in contrast to the prior art by the combination of these mirrors and the lenticular action of the solid state active medium.

Since such a geometrical configuration possesses full spherical symmetry (up to the edges of the mirrors) the system is within these limits fully angularly degenerate. By this is meant that there is no preferred axis of oscillation within these limits. The second part of the invention relates to the methods of removing or lifting the above mentioned degeneracy of the cavity by perturbing the optical symmetry of the system via externally supplied and controlled electric or magnetic fields. These external fields accomplish the perturbation of the symmetry by altering the polarization status of the light beam traversing the interspace between the active medium and the external mirrors. The external fields are so designed and the materials in the interspace are so chosen that the perturbation exhibited in the form of an effective reflectance function is such that at any given time and for any given external voltage or current there is only one single axis through the system along which the system possesses minimum loss or maximum Q. In all other directions the losses are higher or the effective Q is lower. Consequently, the laser, by the nature of its nonlinear oscillatory character will tend to oscillate only along the direction of the maximum Q. In other words, only that one of the infinite number of possible modes whose apices coincide with the axis of maximum Q will be sustained in the oscillations; all others will not. Since the angular position of the axis of maximum Q is a function of the external fields, the time variations of these fields will result in the continuous angular scanning of a mode.

The speed at which this scanning can be accomplished is limited by either the speed at which the external fields can be varied or by the natural decay time of the lasing energy level of the particular active medium chosen. Both of these two limitations are such that a scanning speed in excess of one megacycle is easily obtained.

The resolution of the system i.e., the smallness of the spot on one of the mirrors of the laser cavity is determined only by the effective numerical aperture of the system. In practice the numerical aperture is reduced by the spherical aberrations of the basic laser cavity of this invention. Several possible modifications of the basic laser cavity will be discussed later that are aimed at reducing such spherical aberrations.

An object of this invention is to provide a conjugated concentric laser cavity that has a high angular degeneracy.

A further object of this invention is to provide a laser cavity wherein the active medium itself acts as a lens.

Still another object is to provide a scanning laser wherein the scanning is initiated within the cavity rather than external to the cavity.

Still another object is to provide a scanning laser wherein such scanning is affected while the laser beam is being generated.

Yet another object is to attain a scanning laser capable of scanning at high speeds, with high resolution and with wide angular fields.

The foregoing and other objects, features and advantages of the invention will be apparent from the following more particular description of preferred embodiments of the invention as illustrated in the accompanying drawings.

In the drawings:

FIG. 4 is a vector diagram showing the instantaneous values of two Cartesian components of the light vector emerging from the active medium of the laser cavity.

FIG. 5 is an example of a scheme for obtaining laser scanning employing essentially the Kerr magneto-optic effect.

FIG. 6 is a plot of magnetic field strength as a function of position angle $\alpha$ and is used as an aid in understanding the operation of the scheme of FIG. 5.

FIG. 7 is a vector diagram showing the rotations of the light vector $E_0$ at various points along the axis of the system.

FIG. 8 is a plot of the effective reflectance function along the surface of a mirror of the lasing cavity as a function of the angular position coordinate $\alpha$.

Figure 1:
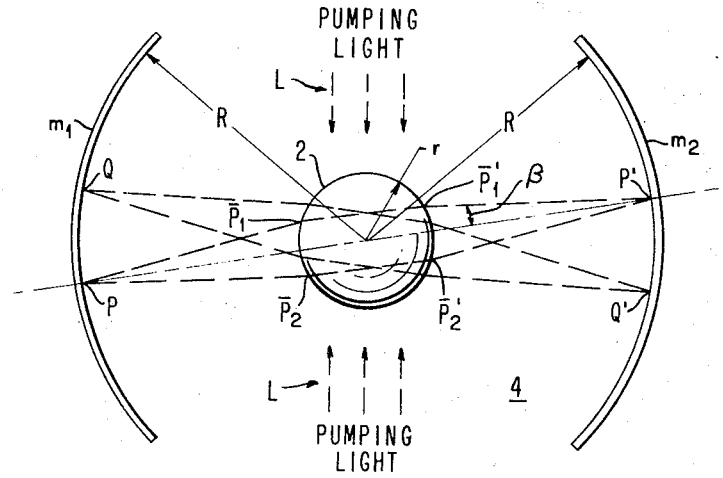
FIG. 1 is a schematic ray optics diagram of the conjugated-concentric cavity embodiment of the invention.

In FIG. 1, which depicts schematically the conjugated-concentric cavity only, and which could be either spherically or cylindrically symmetric, the active medium 2 would be a ruby, which is normally sapphire doped with chromium, GaAs, neodymium-doped glass, or any other solid state material capable of providing quantum mechanical amplification when excited with pumping energy L. Such active medium is in the form of a sphere and it has a refractive index $n$. Mirrors $m_1$ and $m_2$ are concentric and each has a radius of R. The substance 4 surrounding the active medium 2 and lying between mirrors $m_1$ and $m_2$ could be of any material, even air, so long as its index of refraction $n_0$ is less than the index of refraction $n$ and it is a substance that has a reasonably high transmission for the lasing light. The radius R of the cavity is selected by the well-known Gaussian lens formula $$R = \frac{nr}{n-n_0}$$

(1) where $n > n_0$. In short, the R is chosen so that the lenticular action of the ruby 2 makes the two mirrors $m_1$ and $m_2$ the object and image surfaces of the ruby 2. Thus the nature of the ruby 2 is such that it serves two primary functions, namely, an amplifying medium (active element) and a lens (a passive element). The material chosen for element 2 should be one that will readily convert pumping energy L into stimulated emission and also serve as a lens in accordance with the relationship (1) noted above.

From the geometry of FIG. 1 it is evident that this type of resonant cavity is fully spherically symmetric (within the edges of the mirrors $m_1$ and $m_2$). Consequently, the cavity is within these limitations also fully angularly degenerate. Furthermore, it will be evident to those skilled in the art that one of the basic transverse modes of this cavity i.e., the electromagnetic field distribution that repeats itself after every oscillatory bounce, is of the form shown in FIG. 1 in terms of the geometrical optics' approximation by its outer rays P $\overline{P}_1$ $\overline{P}_1'$ P' and P $\overline{P}_2$ $\overline{P}_2'$ P', respectively. The basic characteristic of such a mode is that it is convergent at the surfaces of the mirrors $m_1$ and $m_2$. In other words, the maximum concentration of the energy is at the points on the sphere coinciding with the surfaces of the mirrors.

Due to the high angular degeneracy of the cavity system, this cavity can support one or many of such basic modes simultaneously with the oscillations along any angular direction P P' within the total cone determined by the outer diameter of the mirrors $m_1$ and $m_2$. If no external, deliberate perturbations or mode selection operations are performed, the number of these "convergent" modes, as well as their angular direction, will depend only on the perturbations due to the inhomogeneity of the material, misalignment of and defects on the mirrors, as well as the inhomogeneity in the distribution in and the amount of the pumping energy L.

In the other aspect of the invention, to be described hereinafter, deliberate perturbations will be introduced into this cavity to select one of these modes oscillating at a given time in a desired direction.

The width $\overline{P}_1'$ $\overline{P}_2'$ of the mode distribution at the surface of the active lens 2 determines the size of the light spot at the mirrors $m_1$, $m_2$. More precisely, this size, which is related to the resolution of the system is a function of its effective numerical aperture $$NA \cong \frac{D_0}{2(R-r)}$$

where $D_0 = \overline{P}_1'\,\overline{P}_2'$. The numerical computations of the modes show that the effective diameter D of such a spot at the mirrors can be expressed as follows:

$$D \cong 1.6 \times D_A = 1.6 \times \frac{1.22 \cdot \lambda}{NA}$$

where $\lambda$ is the lasing wavelength and 1.6 is the numerical factor arising from the above calculations, and $D_A$ is the diameter of the conventional Airy disc pattern for this numerical aperture.

In FIG. 1, angle $\beta$ is the angle between a principle axis P P' and the outermost ray $\overline{P}_1'$, P'. For the case where ruby is the active medium 2, the index of refraction $n$ for ruby is 1.76 and the index of refraction $n_0$ for nitrobenzene is 1.553. The numerical aperture of the lens cavity 2 is sine $\beta$, or for relatively small angles, equal to $$\tan \beta \approx \frac{r}{R} \cdot \frac{r}{R}$$

from Equation 1 above, can be expressed as $$n_0 - \frac{n_0^2}{n}$$

which then becomes equal to 0.17. The corresponding diameter D of the classical Airy disc is $$D_0 = \frac{1.22 \times 0.7}{0.17} = 5 \text{ microns}$$

The actual size of the spot of the lasing mode is 60% larger, i.e., $D = 8$ microns. The resolution of the lasing cavity of this invention exceeds the resolution of the best flying spot scanners by an order of magnitude and is also independent of the angular position of the spot on mirror $m_1$ or $m_2$. The resolution obtained assumes a magnification ratio of 1:1.

Since the volume of the active medium 2, not participating in the amplification due to spherical aberrations, is uselessly pumped, it is desirable to reshape the active lens 2 in such a way as to minimize the unused volume.

Figure 2:
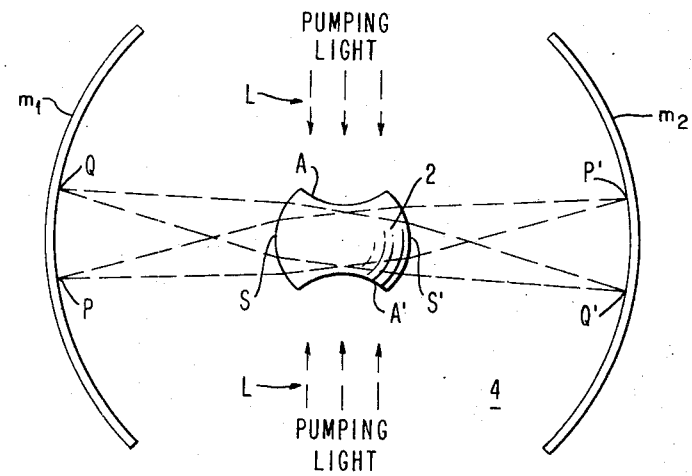
FIG. 2 is another embodiment of the conjugated-concentric cavity shown in FIG. 1.

A possible modification of the shape of the active medium 2 is shown in FIG. 2. FIG. 2 does not detract from the basic invention set forth in FIG. 1 in that the latter is an operative device, per se, but the embodiment of FIG. 2 teaches a technique for minimizing the deleterious effects of spherical aberrations. In FIG. 2, the active medium 2 has a portion of its sphere hollowed out at the portions A and A' where the pumping light L enters the active medium 2 so that there will be no loss of light energy to a portion of the laser that serves no useful purpose. Many other means than the one shown in FIG. 2 can be employed to reduce the deleterious effects of spherical aberrations, but they are incidental to the basic invention shown in FIG. 1. Such means are chosen consistent with the type of materials used for the active medium 2 and there is no need to set forth the many combinations of active spherical lasing media and spherical aberration corrective techniques that can be used. To minimize reflection losses at the interfaces of the active lens 2 and its surrounding medium 4, surfaces S and S' can be coated with antireflection coatings.

In summary, FIG. 1 shows the active medium 2 in the form of a sphere having a radius $r$ (or in the form of a cylinder of radius $r$ if only a two-dimensional scanner is desired) and an index of refraction $n$. The spherical mirrors $m_1$ and $m_2$ have the same radius R and the index of refraction of the material surrounding the active medium 2 has an index of refraction $n_0$. The materials and dimensions chosen are governed by the relationship $$R = \frac{nr}{n - n_0}$$

wherein $n > n_0$. The respective radii of curvature $R_1$ and $R_2$ of mirrors $m_1$ and $m_2$ need not be the same, but such differences will not affect the behavior of the system so long as the two mirror surfaces are optically conjugate. Such different radii of curvature will merely result in different optical magnification.

When $R_1 = R_2 = R$ has been chosen in accordance with the relationship (1), the spherical active medium 2 acts as a lens at a magnification of 1:1 so that one maximum point of energy P of the laser beam is considered as the object point and the other maximum point of energy P' is the image point of the beam. Any other point Q on the surface of mirror $m_1$ would be focussed by the lens 2 as point Q' on mirror surface $m_2$. Thus the lenticular action of lasing element 2 makes the two mirrors $m_1$ and $m_2$ each others object and image surfaces. The lasing cavity of FIG. 1 supports all modes equally well. Such modes being of the form as shown by the volume enclosed by the rays P $\overline{P_1}$ $\overline{P_1}'$ P' and P $\overline{P_2}$ $\overline{P_2}'$ P'.

Figure 3:
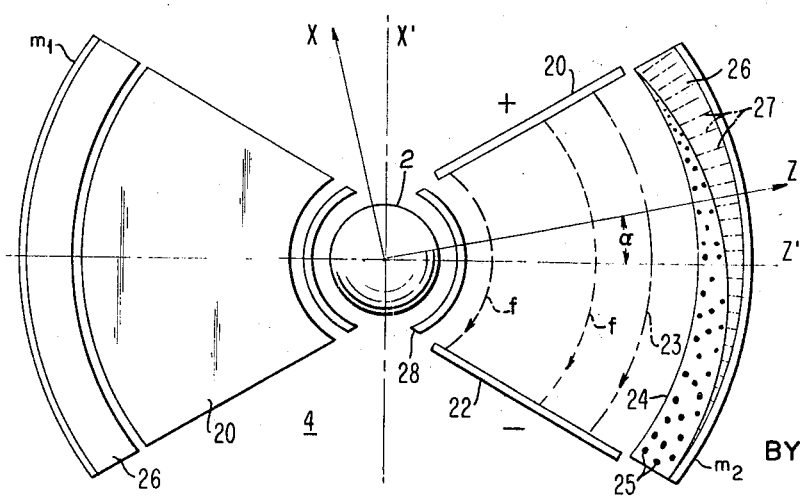
FIG. 3 is an example of a scheme for obtaining scanning of a laser beam employing essentially the Kerr electro-optic effect. The right hand side of FIG. 3 provides scanning in the X–Z plane and the left hand side is physically the same as the right hand side but rotated 90° about the Z axis to provide scanning in the Y–Z plane.

Now we turn to FIG. 3 to examine the second aspect of the invention, namely, the means relied upon for removing or "lifting" the above described angular degeneracy of the cavity by perturbing the optical symmetry of the conjugated-concentric cavity, such means being an externally supplied and controlled electric field. The basic features of the method depicted in FIG. 3 is to accomplish the above mentioned perturbation as well as achieving the angular scanning of the axis of maximum Q. This is accomplished by an interplay of the time varying, angularly invariant, phase delay of one component of the electric field in one portion of the lasing cavity and the angularly variable but time invariant phase delay of the same field component in the other portion of the lasing cavity. As seen in FIG. 3, the active medium 2 could be of ruby and the material 4 between mirrors $m_1$ and $m_2$ would be of nitrobenzene. It will be seen that nitrobenzene was selected because it has a high Kerr constant. Other materials having a high Kerr constant could be chosen so long as the relationship (1) noted hereinabove is adhered to. Electrodes 20 and 22 are connected to a suitable source of voltage (not shown) for applying an electric field $f$ that is parallel to the plane of the drawing. The optic axis 23 of the nitrobenzene is parallel to the electric field $f$. A compensator sheet is in principle the same as a Babinet compensator and is made of glass or plastic 24 suitably stressed and a thin tapered glass or plastic sheet 26 of the same material as 24 but unstressed. The optic axis 25 of the tapered sheet 24 is perpendicular to the plane of the drawing and the optic axis 27 of the sheet 26 is radial. The Kerr electro-optic effect applies a relative phase delay between the two components of the light vector when passing through certain materials like nitrobenzene which are immersed in a high electric field. The two components are: (1) that parallel to the electric field and, (2) the one perpendicular to the external electric field.

For the method to operate, it is assumed that a polarizer 28 is inserted between the active lens 2 and the surrounding medium 4. In the case of crystals like ruby, the effect of the polarizer 28 is supplied by the crystal itself, namely, by the polarized nature of its fluorescence. If the light emerging from the active medium 2 is linearly polarized in a direction lying in a plane that is at 45° to the X and Y axes (see FIG. 4), and the external field $f$ is oriented as shown in FIG. 4, the two components $e_x$ and $e_y$ of the instantaneous light vector $e$ will, upon their traversal through the nitrobenzene portion 4, arrive at the inner surface of compensator portion 24 with a relative phase delay $\delta_K$.

In their passage through the compensator 24, 26, the components $e_x$ and $e_y$ will suffer another relative phase delay $\delta_C$. The first phase delay $\delta_K$ is dependent upon the applied field $f$ which, in turn, is varying in time but is independent of the angular coordinate $\alpha$. Thus $\delta_K = \delta_K[f(t)]$. The second phase delay $\delta_C$, however, is time independent but is dependent upon the angular position $\alpha$, that is, $\delta_C = \delta_C(\alpha)$. Upon the reflection from mirror $m_2$, the two components $e_x$ and $e_y$ of the light vector will suffer the same delays $\delta_C$ and $\delta_K$ before returning into the active medium 2 through the polarizer 28. On their return to the polarizer 28, the two components $e_x$ and $e_y$ may be expressed as $$e_x = E_x e^{-i\omega t}$$
$$e_y = E_y e^{-i[\omega t - 2(\delta_K - \delta_C)]} \quad (2)$$

The polarizer 28 will pass only the cosine $\pi/4$ part of both components $e_x$ and $e_y$. Thus, the combined instantaneous field $e$ reaching the active medium 2 will be determined by the relationship:

$$e = \frac{\sqrt{2}}{2}(e_x + e_y) = \frac{\sqrt{2}}{2} e^{-i\omega t}[E_x + E_y e^{i2(\delta_K - \delta_C)}] \quad (3)$$

The resulting light intensity arriving at the active medium 2 can be expressed as follows:

$$I = \langle e \cdot e^* \rangle = \frac{1}{2}[\langle E_x^2 \rangle + \langle E_y^2 \rangle + 2\sqrt{E_x E_y} \cos^2(\delta_K - \delta_C)] \quad (4)$$

where * denotes the complex conjugate and the brackets $\langle \rangle$ the time averaging operation. If we neglect the differential absorptions of the two components $e_x$ and $e_y$ we obtain the following relationship:

$$\langle E_x^2 \rangle = \langle E_y^2 \rangle = \frac{I_0}{2} \quad (5)$$

where $I_0$ is the input intensity of the light arriving at the polarizer 28. Then, instead of Equation 4 we have:

$$I = \frac{1}{2} I_0[1 + \cos 2(\delta_K - \delta_C)] = I_0 \cos^2(\delta_K - \delta_C) \quad (6)$$

The effective reflectance as a function of time and angular position can be expressed now by the relationship:

$$R_{eff}(t, \alpha) = \frac{I}{I_0} = \cos^2[\delta_K(t) - \delta_C(\alpha)] \quad (7)$$

In other words, by means of the phase delay imposed through the Kerr effect (using an externally applied electric field $f$) and the angularly variable phase delay introduced by the Babinet compensator, one obtains an intensity of light returning to the active medium 2 which is both time and angle dependent.

Since the Q of the cavity is proportional to $R_{eff}$, it is seen that the position of the axis of maximum Q will depend upon the applied voltage (which is variable with time) and the shape of the cosine square function in Equation 7 will serve as a spoiler of all modes other than those whose axes closely coincide with the axis of maximum Q. As seen in FIG. 8, the maximum angular field $2\alpha_0$ should be such as to prevent the occurrence of two maxima of the reflectance function $R_{eff}$ within it. Alternatively, the period $p$ should be larger than $2\alpha_0$, else double degeneracy in the system will occur.

The positioning of the axis of maximum Q in the Y-Z plane, that is, the scanning in the Y-Z plane, can be performed in the same way by providing the left hand space of FIG. 3 with the same physical structure as shown in the right hand portion of FIG. 3 but rotated 90° about the Z' axis.

FIG. 5 is another method for obtaining scanning but differs from the system shown in FIG. 3 in that it relies upon the Faraday magneto-optic effect, rather than the Kerr electro-optic effect, to obtain the identical results as described hereinabove. Since the two halves of FIG. 5 are identical except for the 90° rotation of all the elements in the left half of the figure about the Z' axis, the description of the operation of the right half of the system of FIG. 5 will suffice to explain the invention. Inside the lasing cavity between the active medium 2 and the mirror $m_2$ are two elements hereafter to be referred to as Faraday rotators. The central rotator is $R_{1R}$. Polarizer $P_R$ is placed between the active medium 2 and rotator $R_{1R}$ if the active medium 2 itself does not have polarized fluorescence. The central rotator $R_{1R}$ is placed in a magnetic coil C providing a radial magnetic field $H_{1R}$. The other Faraday rotator is designated $R_{2R}$ and is immersed in its own static magnetic field $H_{2R}$, with field distributions as indicated in FIGS. 5 and 6. Such magnetic field may be created by permanent magnets 50 and 52.

The mirror field $H_{2R}$ is stationary but its intensity is an odd monotonic function of the angular position coordinate $\alpha$ (see FIG. 6). The field $H_{1R}$ of the central rotator $R_{1R}$ is uniform with respect to $\alpha$ but variable in time. At time $t_0$, when laser oscillations begin, the polarization of the initial wave emerging from the laser medium 2 will be determined by the polarizer $P_R$. Let the transmission axis of the polarizer $P_R$ be in the plane $X=0$. When the polarized light passes through the first rotator $R_{1R}$, the light will suffer a rotation $\theta_{1+}=K_1H_{1R}(t)$ in which $K_1$ is a constant depending on the Verdet constant of the medium 4 and the geometry of such rotator $R_{1R}$. The rotation $\theta_{1+}$ is indicated as going from 0 to 1 in FIG. 7.

In passing through the second rotator $R_{2R}$, the light will undergo additional rotation $\theta_{2+}$, $\theta_{2+}$ going from 1 to 2 in FIG. 7 and being equal to $K_2'H_2(\alpha)$ where $K_2'$ is the Verdet constant for the second rotator and $H_{2R}(\alpha)$ is the magnetic field of the second mirror rotator $R_{2R}$ at one point of the mirror $m_2$ corresponding to the angle $\alpha$. Upon reflection from the mirror $m_2$, the light will be rotated once more by the amount $\theta_{2-}$ (from point 2 to point 3 of FIG. 7) and $\theta_{1-}$ (from point 3 to point 4 of FIG. 7), $\theta_{2-}$ and $\theta_{1-}$ being the same in magnitude as $\theta_{2+}$ and $\theta_{1+}$, respectively. The Faraday rotation is additive regardless of the direction of propagation of light from the active medium 2. Thus, the net total rotation $\theta$ (from 0 to 4 of FIG. 7) of the beam returning into the polarizer $P_R$ will be $\theta=2(\theta_1+\theta_2)$.

From the vector diagram of FIG. 7, it is seen that the component $E_y$ of the rotated light vector $E_0'$ will be equal to $E_0' \cos \theta$, which in turn is equal to $E_0 \cos \theta$ if absorption through the rotators $R_{1R}$ and $R_{2R}$ is negligible. In effect, the effective reflectance $$R_{eff}(t,\alpha) = \left(\frac{E_y}{E_0}\right)^2 = \cos^2 \theta = \cos^2 2[K_1H_{1R}(t) - K_2H_{2R}(\alpha)]$$

The last expression is identical in form to the effective reflectance function obtained in the electrical variant of this method. All consequences of the thus obtained $R_{eff}$ for the magneto-optical method for removing the angular degeneracy from mirror $m_2$ are the same as in the electrical method described with respect to FIG. 3.

SUMMARY

The invention described hereinabove teaches that a scanning laser device can be made so that it possesses the following highly desirable properties:

(1) High scanning speed stemming from the fact that the scanning is controlled by electrical means within the laser cavity itself.

(2) High resolution of the spot which is a result of the generation of the laser light in a particular direction within a highly angularly degenerate laser cavity rather than by the deflection of light already produced by a source external to the scanning system.

(3) High angular field which is equally due to the highly angularly degenerate laser cavity produced by this invention.

(4) The very fact that the device is a laser type device, the output energy is considerably higher than that obtainable from conventional scanners, i.e., a cathode ray tube.

The above noted properties permit the invention to be used as a search optical radar, as a means of readout of optically stored information, as an electrically controlled machining tool where the laser beam produced is used for its heating properties, and for general purposes of display. Other uses will readily reveal themselves to those skilled in the art.

While the invention has been particularly shown and described with reference to preferred embodiments thereof, it will be understood by those skilled in the art that various changes in form and details may be made therein without departing from the spirit and scope of the invention.

What is claimed is:

1. Scanning laser comprising:
    a resonant cavity having two mirrors,
    lens means within said resonant cavity for enabling said two mirrors to be optically conjugate with each mirror being the image of the other,
    an active medium located within said resonant cavity in such a way as to support a plurality of angularly related modes and at a position where all possible directionally different and degenerate modes occupy the largest common volume of said active medium, said active medium providing substantially the same gain and field distribution for all possible modes; and
    means for selecting at least one of all of said possible directionally different and degenerate modes while suppressing the remaining modes.

2. Scanning laser comprising:
    a resonant cavity having two mirrors,
    an active medium in the shape of a lens, said active lens being positioned with respect to the mirrors in such a way that the active lens causes each mirror to be the optical conjugate of the other, and in such a way that the cavity is optically symmetrical in having a plurality of angularly disposed possible modes, with substantially the same gain and field distribution, and
    means for perturbing the optical symmetry of said cavity so that the mode for which the cavity is degenerate can be controlled.

3. A laser device comprising:
    a resonant cavity having two mirrors,
    lens means within said resonant cavity for enabling said two mirrors to be optically conjugate with each mirror being the image of the other, means including an active medium located within said resonant cavity for producing a multiplicity of angularly degenerate modes through said active medium, wherein each of the modes has substantially the same gain and field distribution, and means for perturbing the optical symmetry of said cavity so that the mode for which the cavity is degenerate can be controlled.

4. Apparatus for producing a laser beam comprising:
an active element having a lens configuration,
means for applying pumping radiation to said element, and
concave reflectors enclosing said active laser element, the configuration of said laser element and said reflectors and their relative disposition being such that every point on the surface of one of said reflectors is imaged on a corresponding point on the other mirror surface by the joint action of the reflecting surfaces and the lens action of said active element.

5. Apparatus for producing a laser beam comprising:
a spherically shaped active laser element,
two concentric mirrors surrounding said active element and forming the boundaries of the lasing cavity,
the radii of said mirrors being such that the surfaces of the mirrors are optically conjugated with respect to said active lens, and
means within said cavity for suppressing selected ones of said oscillation modes whereby a preferred axis of oscillation is established within said cavity.

6. Scanning laser comprising:
a resonant cavity having two mirrors,
lens means within said resonant cavity for enabling said two mirrors to be optically conjugate with each mirror being the image of the other,
an active medium located within said resonant cavity in such a way as to support a plurality of angularly related modes and at a position where all possible directionally different and degenerate modes occupy the largest volume of said active medium, said active medium providing substantially the same gain and field distribution of all possible modes; and
means for selecting at least one of all of said possible directionally different and degenerate modes while suppressing the remaining modes.

References Cited

UNITED STATES PATENTS

| | | | |
|---|---|---|---|
| 3,301,624 | 1/1967 | Morriss | 350—52 |
| 3,402,633 | 9/1968 | Herriott | 356—112 |
| 3,432,239 | 3/1969 | Holland | 356—112 |
| 3,432,771 | 3/1969 | Hardy | 331—94.5 |

OTHER REFERENCES

Toraldo di Francia: "On the Theory of Optical Resonators," Proceedings of the Symposium on Optical Masers, Polytechnic Press of the Polytechnic Institute of Brooklyn, Brooklyn, New York, April 1963, pp. 157–70.

RONALD L. WIBERT, Primary Examiner

E. BAUER, Assistant Examiner

U.S. Cl. X.R.
350—150, 151, 202